United States Patent [19]

Shimizu et al.

[11] 3,878,333

[45] Apr. 15, 1975

[54] SIMPLEX ARQ SYSTEM

[75] Inventors: Otoomi Shimizu, Saitama-ken; Hitoshi Koyano, Tokyo, both of Japan

[73] Assignee: Oki Electric Industry Co., Ltd., Tokyo, Japan

[22] Filed: Dec. 5, 1973

[21] Appl. No.: 421,947

[30] Foreign Application Priority Data

Dec. 12, 1972 Japan ............................. 47-123927

[52] U.S. Cl. ........................ 178/23 A; 340/146.1 AL

[51] Int. Cl. ............................ H04l 1/18; G06f 11/00

[58] Field of Search ............ 178/23 A, 2 A, DIG. 3, 178/DIG. 12; 340/146.1 AL, 1 B, 1 BA; 179/15 AE; 325/38 R, 38 A, 38 B

[56] References Cited

UNITED STATES PATENTS 3,506,961 4/1970 Abramson et al. ......... 340/146.1 AL 3,593,281 7/1971 Van Duuren et al. ............ 178/23 A

*Primary Examiner*—Thomas A. Robinson
*Attorney, Agent, or Firm*—Paul & Paul

[57] ABSTRACT

An improved simplex ARQ system for data transmission circuits using a short wave circuit is provided. A block of characters is sent from a master station to a slave station and if an error occurs during the transmission, said block of characters is automatically retransmitted, thus clean output without an error is obtained on a printer in a receiving or slave station. The length of said block is changed according to the instantaneous quality of the short wave circuit, and thus the actual transmission speed is considerably increased.

5 Claims, 11 Drawing Figures

SIMPLEX ARQ SYSTEM

The present invention relates to an error correcting system in printing telegraphy and, in particular, relates to an error control system in short wave telecommunication circuits whose quality is generally unstable due to fading, interference and unstable transmission path.

There are many known error correcting systems, among which the ARQ system, which stands for Automatic Repeat Request, is a typical, good error correcting system. ARQ was originally recommended by the CCIR (Comite Consultatif International des Radio - Communication) of the ITU (International Telecommunication Union) as Recommendation CCIR 476 for message transmission using a short wave circuit. ARQ provides a clean output which has no errors on a receiving printer, in spite of the presence of transmission errors, by automatically correcting those errors, and is suitable for a printing telegraphy system using a short wave circuit. The quality of short wave circuits is not good and is about $10^{-1}$ – $10^{-3}$ in character error rate due to fading, interference etc., while a printing telegraphy system ordinarily requires at least $10^{-5}$ – $10^{-6}$ error rate. Accordingly, ARQ provides an excellent means for correcting errors in printing telegraphy caused by unstable short wave circuit.

The prior ARQ system converts, at a transmitting or master station, a five element start-stop code to a seven element code by removing the start and stop elements. Four elements of the seven element code are marks or 1 and three elements are spaces or O. The transmitting station sends said seven element code for a block, which usually consists of three characters each of which has said seven elements, and then the transmitting station waits for an acknowledgement from a receiving station. At a receiving or slave station, a received block is tested to determine if each of the seven element characters in the block has four mark elements and three space elements. When the signal is received without an error, the signal is again converted from a seven element code to a five element code by adding start and stop elements and is sent to a receiving terminal or printer. At the same time the receiving station transmits an acknowledgement signal CS1 or CS2 to the transmitting station. The alternative transmission of CS1 and CS2 between each block received by the receiving station means that the signal is being received without any error.

However, if any error occurs due to fading or interference in a transmission circuit, a mark element changes to a space element, or vice versa, and destroys the condition of four marks and three spaces at the receiving station. When the receiving station recognizes an error, it stops sending the received signal to the receiving printer and returns double CS1 or double CS2 to the transmitting station. In receiving said double CS1 or double CS2, the transmitting station stops sending a series of messages and re-transmits the last transmitted message block which consists of three characters.

At the receiving station if the re-transmitted block is received without error it is passed to the receiving printer, while if an error is again detected the double CS1 or double CS2 procedure is repeated until the block is received without error and is passed to the receiving printer. Thus a clean output without any error is obtained on the receiving printer.

Accordingly, in the above described prior ARQ system, the transmitting station alternately sends a message block and waits for the CS1 or CS2 acknowledgement. The ratio of the sending duration to the waiting duration depends upon the propagation time of the signal between the two stations, switching time for the alternate sending and receiving operation and control time for processing the control signal such as CS1 or CS2 etc. Said ratio is 1 : 1, or the waiting duration exceeds the sending duration. Accordingly the time efficiency of the prior ARQ system could not be more than 0.5, even if the transmission circuit is ideal and no transmission error occurs.

A disadvantage of the prior ARQ system is that the circuit efficiency is small due to frequent switching of sending and receiving operations and long waiting periods.

The other disadvantage of the prior ARQ system is that actual communication speed is low, due to said small efficiency, when compared to the original transmission speed in the propagation circuit.

Accordingly, an object of the present invention is to provide an improved simplex ARQ system which overcomes the above-mentioned drawbacks.

Another object of the present invention is to provide an improved simplex ARQ system whose efficiency and communication speed are satisfactory.

A further object of the present invention is to provide an improved simplex ARQ system which enables the effective use of the small number of short wave frequencies and shortens the communication time.

According to the present ARQ system, the number of characters in a block is variable, and the length of a block is an integer multiple of a basic block, for instance an odd multiple of the basic length, and the length of a block is controlled according to the instantaneous quality of the transmission circuit. Thus the transmission circuit is utilized effectively and the information or message is transmitted with high speed and high accuracy.

Further features and advantages of the present invention will be apparent from the ensuing description with reference to the accompanying drawings to which, however, the scope of the invention is in no way limited.

Figure 5:
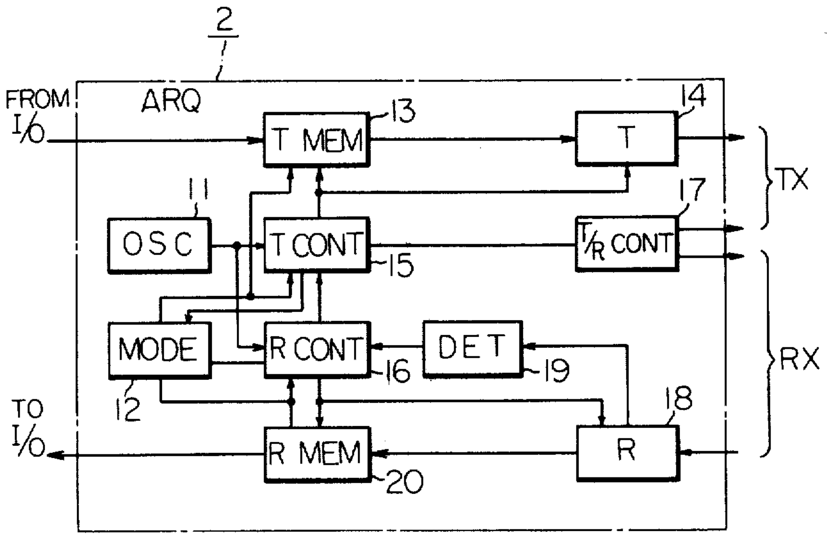
FIG. 5 is a brief block diagram of a simplex ARQ terminal equipment according to the present invention.
Figure 6:
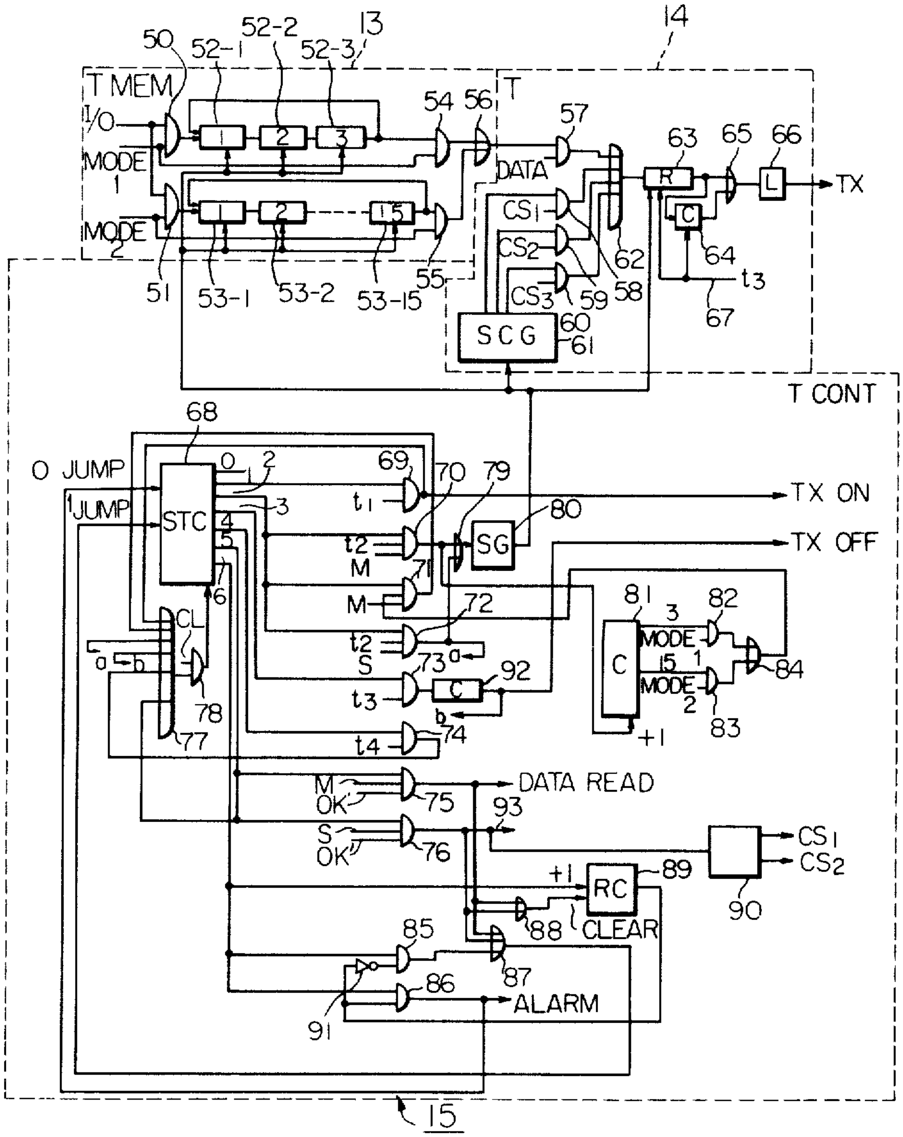
Figure 7:
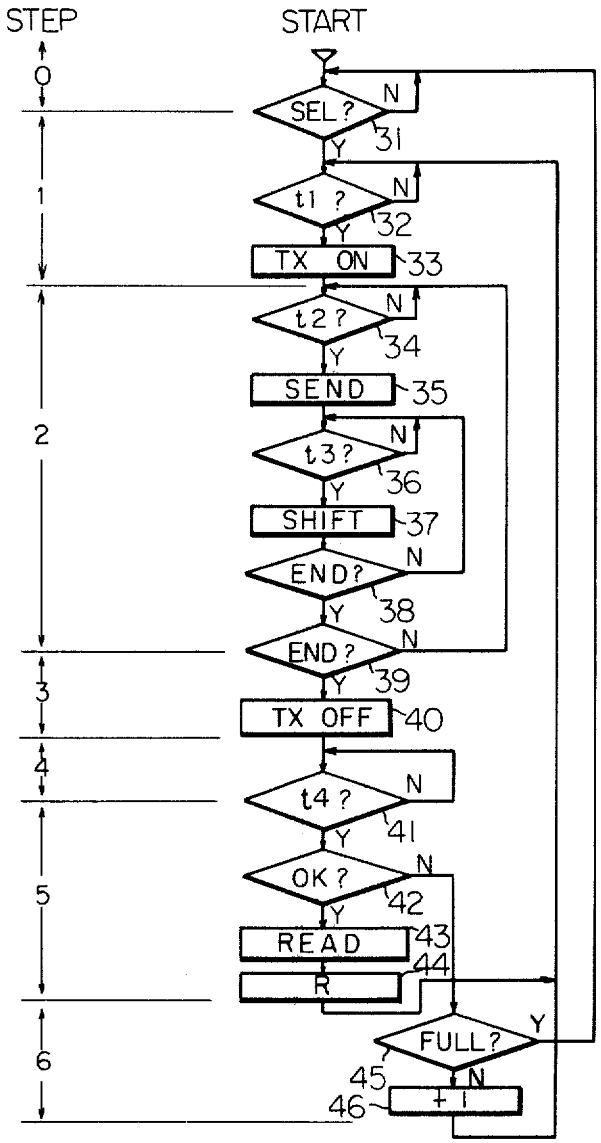
Figure 8:
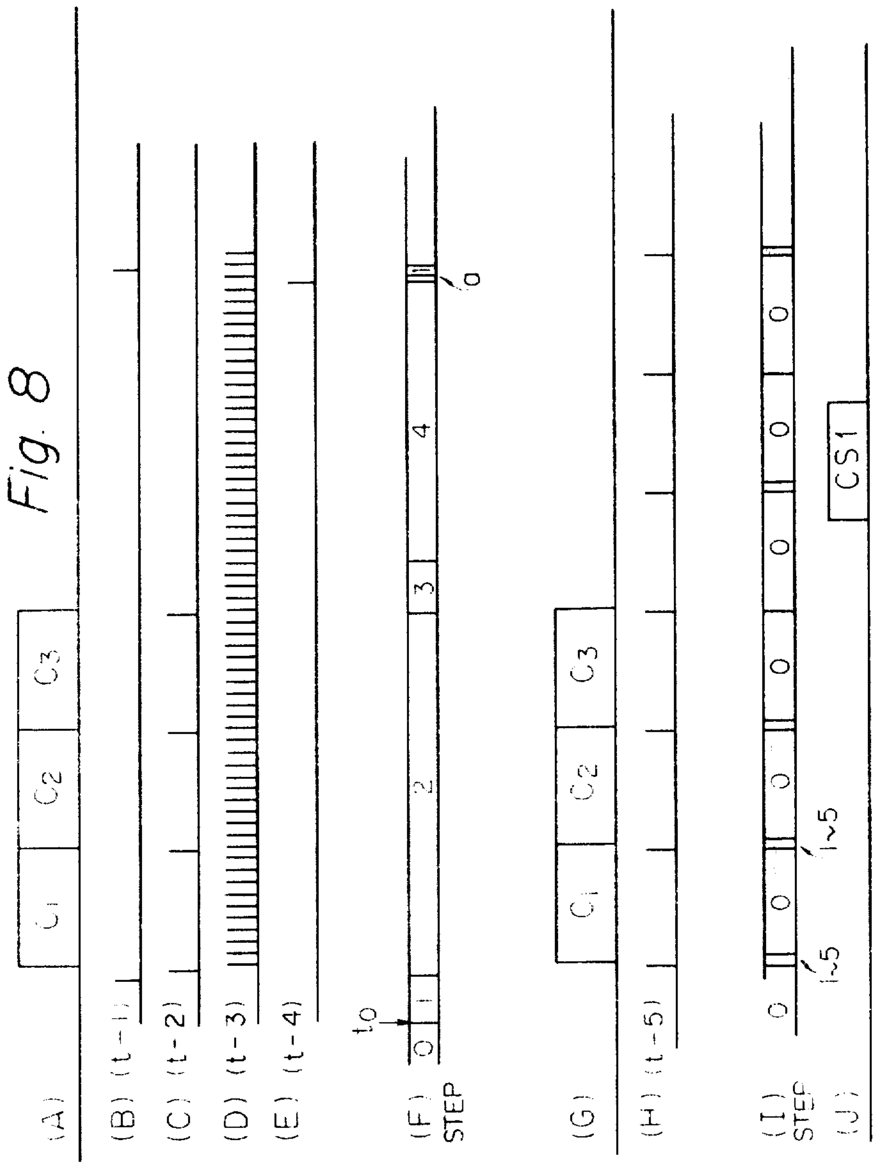
Figure 9:
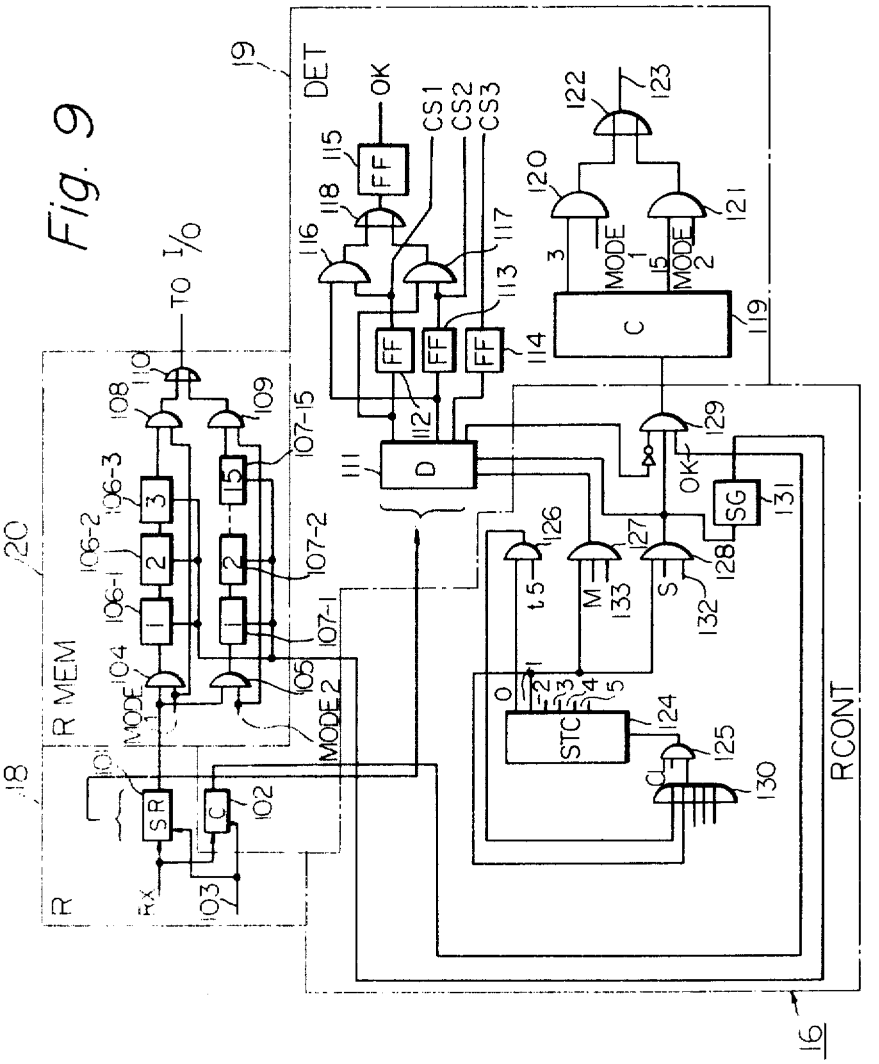
Figure 11:
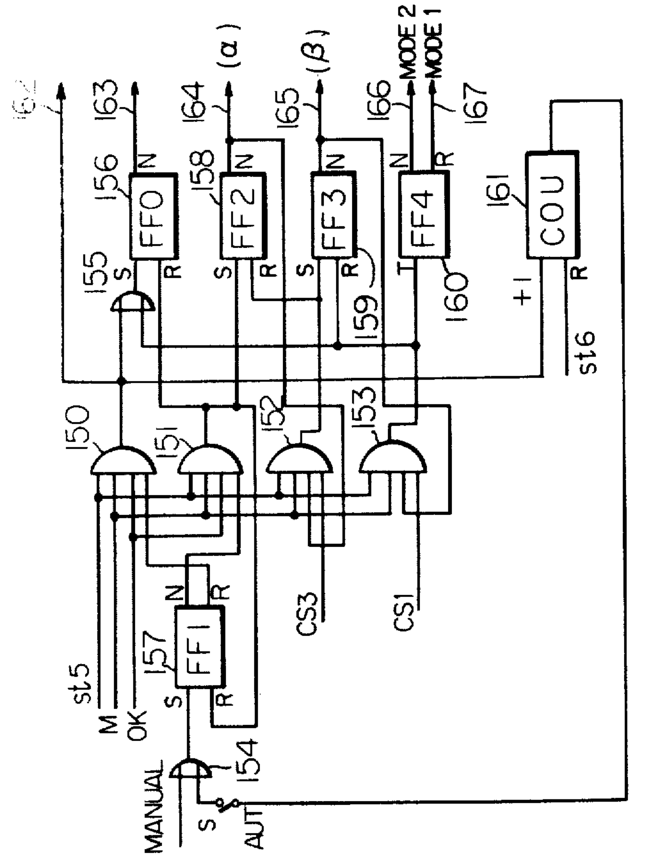
Figure 10:
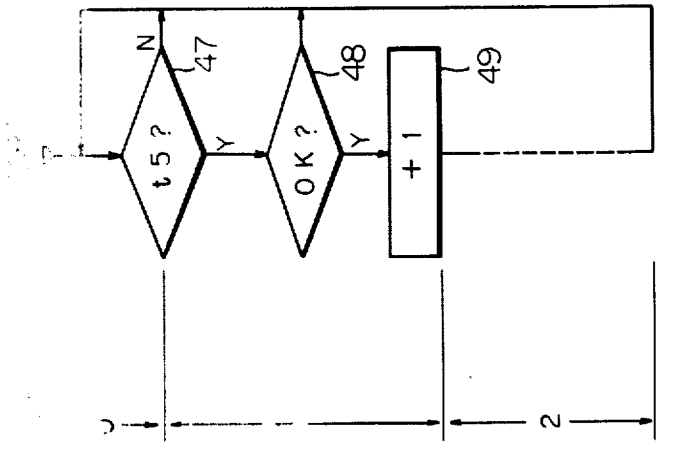

FIG. 6 is a detailed block diagram of a transmission memory 13, a code transmission circuit 14 and a transmission control 15 in FIG. 5;

FIG. 7 shows a general flow chart of the transmitting operation of a simplex ARQ system according to the present invention;

FIG. 8 shows an explanatory detailed time sequence of the operation of a simplex ARQ system according to the present invention;

FIG. 9 is a detailed block diagram of a receiving control 16, a code receiving circuit 18, a code detection circuit and a receiving memory 20 in FIG. 5;

FIG. 10 shows a general flow chart of the receiving operation of a simplex ARQ system according to the present invention;

FIG. 11 shows a block diagram of a mode switching circuit of a simplex ARQ system according to the present invention.

At first, the influence of the number of characters in a block to the communication efficiency is mathematically analyzed. In the following analysis, the ratio of the time Z/N in which one character is transmitted with constant speed without an acknowledgement and the time $\tau$ in which one character is transmitted with an acknowledgement for each block will be explained. For explanatory purposes it is assumed that the waiting time between blocks in the latter part of the above ratio is the period required for the transmission of the three characters.

a. The number of blocks to be transmitted is $N/n$; wherein N is the number of characters to be transmitted and $n$ is the number of characters in a block.

b. The time for transmission of all blocks neglecting retransmission is $(n+3)\tau \cdot N/n$; where $\tau$ is the time required for transmission of a character.

c. The time for transmission of all blocks including repetition or re-transmission time is $$N/n(n+3)\tau(1+Q+Q^2+\ldots)$$

where Q is the block error rate. In the second parenthesis above, 1 relates to the case where no error occurred, Q relates to the case where an error occurred once, $Q^2$ relates to the case where an error occurred twice, etc.

d. The relationship between the block error rate Q and the character error rate is $$Q = P(n+1)$$

where an effective number of characters in a block is assumed to be $(n+1)$, including the transmission of a control character, and errors occur at random.

e. Accordingly, the period Z that is required for transmission of N characters by blocks having n characters, neglecting higher terms than $Q^5$, is $$Z = (N/n)(n+3)\ \tau\ [(1-Q^4)/(1-Q)] = N\ \tau\ [(n+3)/n]\cdot[1-P^4(n+1)^4]/[1-P(n+1)]$$

f. Therefore, the ratio of the period Z/N for one character transmission with an acknowledgement, to the period $\tau$ for one character transmission without an acknowledgement is:

$$Z/N\tau = [(n+3)/n]\cdot[1-P^4(n+1)^4]/[1-P(n+1)]$$

Figure 1:
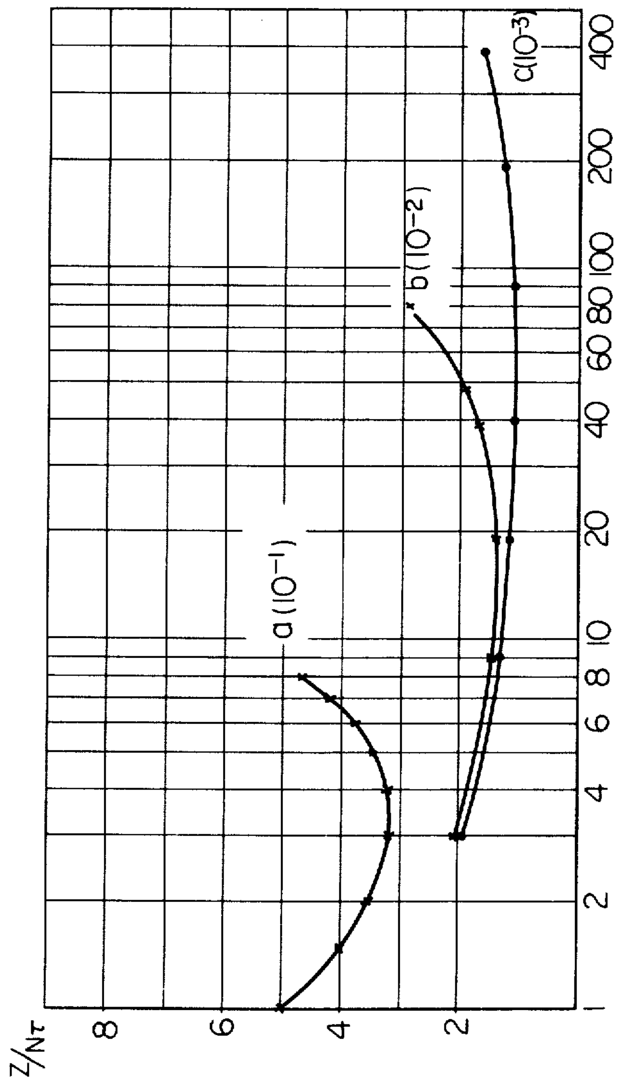
FIG. 1 shows curves concerning the relationship between the number of characters in a block and the transmission efficiency.

FIG. 1 shows the curve of above equation, in which the horizontal axis relates to the number of characters n in a block and the vertical axis shows the value of $Z/N\tau$, and the curves $a$, $b$ and $c$ relate to character error rate $10^{-1}$, $10^{-2}$ and $10^{-3}$, respectively.

From FIG. 1, it will be clearly understood that the optimum number of characters in a block is 3 or 4 characters when error rate is $10^{-1}$, 15 or 16 characters when error rate is $10^{-2}$, and about 100 characters when error rate is $10^{-3}$.

Figure 2:
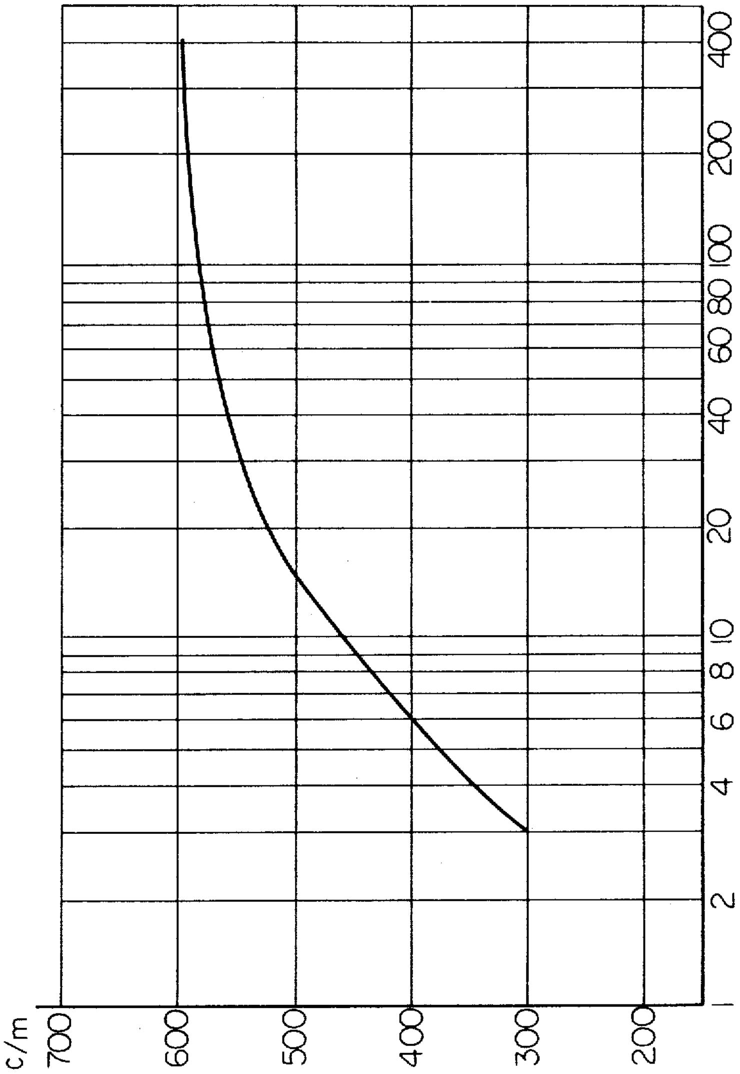
FIG. 2 shows a curve concerning the relationship between the number of characters in a block and the transmission speed.

FIG. 2 shows the relationship between the number of characters in a block in the horizontal axis and communication speed (characters per minute) in the vertical axis. The waiting period between each transmission in FIG. 2 equals the period for transmission of three characters and the transmission time for one character is 100 mS. For instance, if a block length is three characters long the communication speed is 300 characters per minute, however, the communication speed cannot exceed 600 characters per minute whatever the length of the block may be. Further, the block length of about 20 characters is preferable in view of the block length and communication speed.

The quality of a short wave circuit is on the order of $10^{-1}$ – $10^{-3}$ in character error rate and, therefore, the block length according to the present simplex ARQ system is changed automatically or manually according to the instantaneous quality of a transmission circuit. Preferably, the block length is changed from three characters to fifteen characters, or vice versa.

Figures 3, 4:
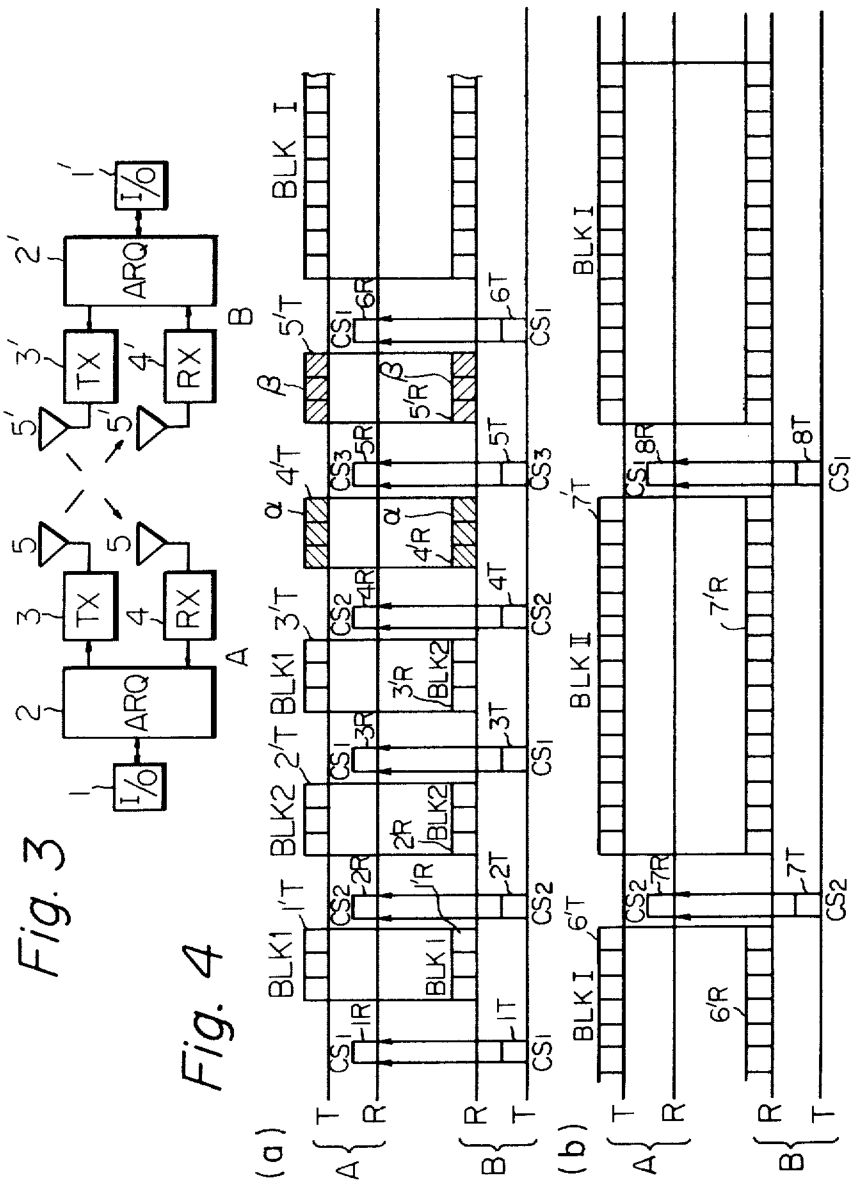
FIG. 3 shows a brief block diagram of a short wave communication system utilizing simplex ARQ terminal equipment according to the present invention.
FIG. 4 shows an explanatory brief time chart of the operation of a simplex ARQ communication system according to the present invention.

FIG. 3 shows a brief block diagram of a short wave communication system utilizing simplex ARQ terminal equipment according to the present invention. In FIG. 3, the station A is a master which controls the whole communication system and the station B is a slave. A message is transmitted from the master station to the slave station while an acknowledgement signal is transmitted in the opposite direction. First a transmission circuit is provided between stations A and B by selective call and then the station A reads an input message from an input-output device 1. The code of said message is, for instance, a five unit start-stop code and the communication speed is 50B. An ARQ terminal 2 converts the five unit start-stop code to an error detecting code like a three-out-of-seven-elements-code, and makes a block consisting of three or fifteen characters. Each block is sequentially transmitted to the station B through a transmitter 3 and an antenna 5. The waiting time between each block equals three-characters in length. It should be noted here that communications speed in a short wave circuit should be at least twice as fast as in a line circuit, since in the former the transmission is interrupted every three characters. Accordingly if the line speed is 50 bits/sec, the communication speed in a radio channel is at least 100 bits/sec. The station B receives the message from station A through an antenna 5' and a receiver 4'. An ARQ equipment 2' of station B tests if the received message is correct. ARQ 2' deems the message correct if each seven elements character is composed of four marks and three spaces. The correct message is re-converted from a seven element code to a five element start-stop code and sent to an input-output device 1' like a printer. The station B returns an acknowledgement signal CS1 or CS2 consisting of one character length to the station A through a transmitter 3' and an antenna 5'. If the message is received correctly, CS1 and CS2 are alternately transmitted, while double CS1 or CS2 is transmitted if the received message is wrong. The station A receives said transmitted signals through an antenna 5 and a receiver 4 to the ARQ equipment 2, which transmits a next block if the preceding block was correct and acknowledgement signals CS1 and CS2 are received alternately, or retransmits the preceding block if CS1 or CS2 is received twice successively. As is apparent from above explanation, the master station transmits a message and receives an acknowledgement, while the slave station receives a message and transmits an acknowledgement, thus a clean output is obtained on a printer at a receiving station.

FIG. 4 shows an explanatory brief time chart of the operation of the ARQ communication system. In FIG. 4, the operational mode of the ARQ is at first mode 1 in which a block is of length three characters, then the mode is changed to mode 2 in which a block length is 15 characters according to the present invention. In FIG. 4, a message is transmitted by either mode 1 in which the block length is three characters in length and the waiting time is also three characters in length, or mode 2 in which the block length is 15 characters in length and the waiting time is three characters in length. A is a master station and B is a slave station and a message is transmitted from station A to station B while an acknowledgement signal is transmitted from station B to station A. When a circuit between stations A and B is provided by, for instance, selective call, the system is initiated in mode 1, and the station B sends a control signal CS1 at time 1T, which is received by the station A at time 1R.

Upon receiving a signal CS1 at time 1R, the station A sends a message block (BLK 1) consisting of three characters at time 1'T, which is received by the station B at time 1'R and if BLK1 is received correctly the station B sends an acknowledgement or control signal CS2 at time 2T, which is received by the station A at time 2R. However, if BLK1 is received wrong by the station B, the station B sends CS1 instead of CS2, since the preceding control signal was CS1, thus double CS1 would be received by the station A. The above cycle is repeated and the station A sends BLK2 at time 2'T and BLK1 at time 3'T and the station B sends CS1 at time 3T and CS2 at time 4T.

At this time, suppose that a switching command which changes a block length from three characters in length to fifteen characters length is applied to the system. Then, the station A sends a signal $\alpha$ at time 4'T, which is received by the station B at time 4'R. The signal $\alpha$ consists of three characters and its meaning is to command preparation for mode switching in the station B. When the station B recognizes the signal $\alpha$, the station B sends control signal CS3 instead of CS1 at time 5T, and CS3 is received by the station A at time 5R. Next, the station A sends a signal $\beta$ at time 5'T, which is received by the station B at time 5'R. The signal $\beta$ also consists of three characters and its meaning is to command actual mode switching in the station B. When the station B recognizes the signal $\beta$, the station B sends a control signal CS1 at time 6T, which is received by the station A at time 6R. Thus the mode of two stations A and B is changed from mode 1 to mode 2. Next, the station A sends a block BLK1 consisting of 15 characters at time 6'T, which is received by the station B at time 6'R, and a similar cycle is repeated and the station A sends BLKII at time 7'T and BLTI at time 8'T, while the station B sends acknowledgement signals CS2 at time 7T and CS1 at time 8T.

The signals $\alpha$ and $\beta$ consist of three characters if the switching command appears under mode 1, while they consist of fifteen characters if the switching command appears under mode 2.

Suppose that the control signal CS1 sent by the station B at time 6T was not received correctly by the station A. In this case though the station B changes to mode 2 while the station A remains in mode 1, the system according to the present invention works well. This is because the period that the station B in mode 2 returns CS1, coincides with a period that the station A in mode 1 awaits CS1, thus the station A can definitely receive CS1 sooner or later before several blocks transmission, and change to mode 2.

FIG. 5 shows a brief block diagram of the simplex ARQ terminal equipment 2 or 2' in FIG. 3. In FIG. 5, reference number 11 shows a standard frequency oscillator (OSC) which generates several kinds of clock or timing pulses. 12 is a mode switching circuit which changes the operation mode of the ARQ system from mode 1 to mode 2 or vice versa thereby changing the number of characters in a block. 13 is a transmission memory (TMEM) which has a register for each operation mode for re-transmission. 14 is a code transmission circuit (T) which receives a five element start-stop code, converts it to a seven element error detecting code and sends it to a transmitter (TX)3 in FIG. 3. 15 is a transmission control (T CONT) which controls the transmission of a message or control signal with a predetermined procedure during a transmission period obtained by the division of clock pulses from the oscillator (OSC)11. 16 is a receiving control (R CONT) which controls the received message and control or acknowledgement signal with a predetermined procedure during a receiving period obtained by the division of clock pulses from the oscillator (OSC)11. 17 is a transmitter and receiver control (T/R CONT) which controls the operation of a transmitter (TX)3 and a receiver (RS)4 in FIG. 3. 18 is a code receiving circuit (R) which receives signals from the receiver (RX)4. 19 is a code detection circuit (DET) which receives signals from the code receiving circuit (R)18 and tests if an error has occurred in the radio transmission circuit. 20 is a receiving memory (R MEM) which temporarily stores the received signal and passes it to an input-output device like a printer.

The operation of FIG. 5 is briefly explained here, but it will be described in detail later with reference to FIGS. 6 through 10. Suppose that the ARQ equipment in FIG. 5 is the master station A (FIG. 3) and it receives a control signal CS1 at time 1R (FIG. 4). The signal CS1 passes through the code receiving circuit (R)18 and is detected by the code detection circuit (DET)19. The receiving control (R CONT)16 memorizes the fact that the station A received the signal CS1. At this time the transmission control (T CONT)14 is at a state of step 4 (later described) which is a state of waiting for a control or acknowledgement signal. Since CS1 shows that no error occurred, the ARQ reads the succeeding, three characters, switches ON the transmitter (TX)3 through the transmitter and receiver control (T/R CONT)17, drives the transmission memory (T MEM)13 and the code transmission circuit (T)14, and transmits the three characters at time 1'T (FIG. 4).

Next, the operation of a slave station B is briefly explained. The ARQ in the station B receives said three characters at time 1'R which is during the receiving period indicated by the receiving control (R CONT)16. The received three characters are tested by the code detection circuit (DET)19 to determine if an error occurred or not. If all three characters were received correctly, a counter in the code detection circuit (DET)19 provides an output signal to the transmission control (T CONT)15, which switches ON the transmitter (TX)3 through the transmitter and receiver control (T/R CONT) 17 and sends a signal CS2 through the code transmission circuit (T)14 at time 2T. The received three characters are, of course, sent to an input-output device through the receiving memory (R MEM)20.

FIG. 6 shows a detailed block diagram of the transmission memory (T MEM)13, the code transmission circuit (T)14, and the transmission control (T CONT)15 of FIG. 5. In FIG. 6, input characters go through AND circuit 50 or 51 to flip-flops 52-1 — 52-3 or flip-flops 53-1 — 53-15, according to the mode at that time, and the characters stored in said flip-flops go to the code transmission circuit (T)14 through AND circuit 54 or 55, and OR circuit 56. Each flip-flop 52-1 — 52-3 or 53-1 — 53-15 functions to store one character respectively. In the code transmission circuit (T)14, a transmission register 63 receives a message or control signal CS1, CS2 or CS3 through OR circuit 62 and AND circuit 57-60 according to the presence of the gate signal DATA, CS1, CS2 or CS3 for AND circuit 57-60. A control signal generator 61 generates the pattern of control signal CS1, CS2 and CS3 and supplies them to AND circuit 58-60. The content of said register 63 is shifted bit by bit by a shift pulse t3 sent through line 67, and is composed into an error detecting code through a check element generator 64 and OR circuit 65, the output of which is sent to a transmitter (TX) through a level converter 66.

A step counter 68 determines the state or step of the ARQ equipment to one of the states O – 6, and supplies an output signal at one of six output lines. The operation concerning the transmission in each state is explained with reference to the state diagram of FIG. 7 and the time chart in FIG. 8. In FIG. 8, (A) shows characters to be transmitted, (B), (C), (D) and (E) show timing pulses $t1$, $t2$, $t3$ and $t4$ respectively, and (F) shows the state or step of the transmission operation for each timing.

In step O, the output signal appears on O output line, but ARQ equipment does not work during step O. Suppose that a selective call was made or a transmitter (TX) was switched ON at time $tO$ of FIG. 8(F), then the step changes to step 1 (reference number 31 in FIG. 7). During step 1, an output signal appears on output line 1 of the step counter 68, and said signal is applied to AND circuit 69. When timing pulse $t1$ appears (FIG. 8(B)), said AND circuit 69 provides signal TX ON, which switches ON a transmitter (TX), and the step changes to the step 2 since a signal from AND circuit 69 is applied to the step counter 68 through OR circuit 77 and AND circuit 78 (reference number 32 and 33 in FIG. 7).

During step 2, an output signal appears on output line 2 of the step counter 68, which is applied to AND circuits 70, 71 and 72. If the station is a master (M), AND circuit 70 applies its output signal to a shift pulse generator 80 through OR circuit 79 at a timing $t2$ (34 in FIG. 7 and FIG. 8(C)). Said shift pulse generator supplies a shift pulse to the transmission memory (T MEM)13 and one character in said memory 13 is sent to the code transmission circuit (T)14 (35 in FIG. 7). Upon receipt of said character the code transmission circuit (T)14 converts the five element start-stop code to a seven element error detecting code, which is shifted and transmitted bit by bit in series by timing pulse $t3$ (36 and 37 in FIG. 7). The operation of reference number 36 and 37 in FIG. 7 is repeated until one character is completely sent out (38 in FIG. 7). An output of AND circuit 70 is also applied to a counter 81, which counts how many characters in a block have been sent out. When all characters in a block (three characters in mode 1 or 15 characters in mode 2) have been sent out, AND circuit 82 or 83 applies a signal through OR circuit 84, AND circuit 71, OR circuit 77 and AND circuit 78 to the step counter 68, the content of which, then, changes to step 3 (39 in FIG. 7).

If the station is a slave (S) during step 2, AND circuit 72 provides a signal to the shift pulse generator 80, however, since one character is enough in a slave station to send, a signal is also applied to the step counter 68 promptly through AND circuit 72, OR circuit 77 and AND circuit 78 and causes the change of the step to step 3.

During step 3, an output signal appears on output line 3 of the step counter 68, said signal is applied to AND circuit 73, which provides a signal to a counter 92 each time timing pulse $t3$ (FIG. 8(D)) appears. When the content of the counter 92 reaches a predetermined value, an output signal from the counter 92 is provided in order to switch OFF a transmitter (TX), (40 in FIG. 7) and the step changes to step 4.

Step 4 is a period of waiting for the result of the test of the preceding transmitted characters. The result is an acknowledgement CS1 or CS2 sent by the receiving stations, and is definitely obtained during step 4 at timing $t4$ (41 in FIG. 7). Said result is applied to the receiving control (R CONT) 16 for judgement.

During step 5, a signal from output line 5 of the step counter 68 is applied to AND circuits 75 and 76. When the station is a master during step 5, AND circuit 75 provides an output signal on the conditions that signal OK is provided (42 in FIG. 7). Signal OK appears in case the result in step 4 is correct. The output (DATA READ) of AND circuit 75 causes the input of succeeding characters from input-output device to ARQ (43 in FIG. 7) and the reset of a re-transmission counter 89 (44 in FIG. 7) through OR circuit 88. Said output of AND circuit 75 also causes the jump of the step to step 1 through OR circuit 87. However, if the result in step 4 shows wrong, no signal appears at output of AND circuit 75, and thus, the step changes automatically to step 6.

On the other hand, when the station is a slave (S) during step 5, AND circuit 76 provides an output signal on the condition that signal OK' is provided. Signal OK' appears when a block of characters are correctly received. The output of AND circuit 76 causes the transfer of received characters from ARQ to the input-output device through line 93, and triggers a selection circuit 90, which selects an acknowledgement signal CS1 or CS2 alternatively. The output of the circuit 90 CS1 and CS2 are applied to AND circuit 58 and 59, respectively. Further, the output of AND circuit 78 causes the reset to zero of the re-transmission counter 89 through OR circuit 88, and the jump of the step to step 1 through OR circuit 87. However, if the signal OK' does not appear, no output signal appears at output of AND circuit 76, and thus, the step changes automatically to step 6.

During step 6, an output signal on line 5 of the step counter 68 is applied to the re-transmission counter 89 causing the up-count thereof, and the AND circuits 85 and 86. If the content of the re-transmission counter 89 has reached a predetermined value, (Y in 45 in FIG. 7), the counter 89 provides a signal to AND circuit 86, causing the appearance of ALARM signal and the jump of the step counter 68 to step O. This is the case when the transmission circuit is extremely poor and the communication between the two stations cannot be continued. However, if the content of the re-transmission counter 89 has not reached the predetermined value (N in 45 in FIG. 7), and inverter 91 applies a signal to AND circuit 85, which causes the jump of the step counter 68 to step 1 through OR circuit 87. Thus the communication is continued.

FIG. 9 shows a detailed block diagram of the receiving control (R CONT)16, the code receiving circuit (R)18, the code detection circuit (DTE)19 and the receiving memory (R MEM)20 in FIG. 5, which concern the receiving operation of a simplex ARQ equipment.

In FIG. 9, a shift register 101 receives characters from the receiver (RX). The content of the register 101 is shifted, bit by bit, according to the applied shift pulse through line 103. The output of the register 101 is applied to the receiving memory (R MEM)20 and a code detection circuit 111. A test circuit 102 also receives characters from the receiver (RX) and tests if each character is correctly received. The circuit 102 recognizes the received character correctly when seven elements of the character consist of four marks and three spaces. The receiving memory (R MEM)20 comprises AND circuits 104, 105, 108 and 109, flip-flops 106-1 — 106-3 and 107-1 — 107-15, and OR circuit 110. The configuration of the receiving memory (R MEM)20 is similar to that of the transmission memory (T MEM)13 in FIG. 6.

FIG. 10 shows an operational flow chart of FIG. 9. The receiving control (R CONT)16 works each time a character is received (FIG. 8(G)), and the operation of it is triggered by timing *t5* in FIG. 8(H).

A step counter (STC)124 in the receiving control (R CONT)16 determines the receiving operation of ARQ equipment.

Step O is a period that the receiving control (R CONT) 16 does not operate. A timing pulse *t5* during step O changes the step to step 1 through AND circuit 126 (47 in FIG. 10 and FIG. 8(I)).

During step 1, a signal is applied to the first gates of AND circuits 127 and 128 from the step counter 124.

Suppose that the station is a master (M), AND circuit 127 provides a control signal to the code detection circuit 111 during the time a signal 133 appears. The signal 133 means that it is a receiving period of the master station. Then the code detection circuit 111 tests the character supplied from the shift register (SR)101, and if the character is control signal CS1, CS2 or CS3, an output signal CS1, CS2 or CS3, is provided through flip-flop 112, 113 or 114, respectively. At the same time, a circuit consisting of AND circuits 116 and 117, OR circuit 118 and flip-flop 115 tests if signals CS1 and CS2 occur alternatively and provides a signal OK on the same condition.

On the other hand, suppose that the station is a slave (S), AND circuit 128 provides a signal to the code detection circuit 111, AND circuit 129 and a shift pulse generator (SG)131 during the time signal 132 meaning a receiving period of the slave station being applied to said AND circuit. The shift pulse generator (SG)131 causes a shift of the received characters in the receiving memory (R MEM)20. AND circuit 129 applies a signal to a counter (C)119 when the received character is not a control character and a signal OK meaning that the character was received correctly from the test circuit 102 (48 in FIG. 10). The counter 119 counts how many characters have been received (49 in FIG. 10). When the content of the counter 119 reaches a predetermined value, namely the number of characters in a block, three or fifteen, a signal 123 meaning that all characters in a block have been received correctly is provided through AND circuits 120 and 121 and OR circuit 122.

During the steps 2 – 5, in rare operation cases such as the reception of a selection call, the count that how many control signals have been received without a break, etc., are performed. The operations in steps 2 – 5 are, however, not essential for the present invention and are not described in detail.

FIG. 11 shows a block diagram of a mode switching circuit (MODE)12 in FIG. 5.

In FIG. 11, a flip-flop (FF1)157 which receives a manual switching command (MANUAL) and an automatic switching command (AUT) through OR circuit 154, triggers a mode switching operation by providing a signal on its output line N. When the mode switching operation is not commanded, AND circuit 150 provides an output signal on the condition that the step of the transmission control (T CONT) in FIG. 6 is step 5, the station is a master (M) and the acknowledgement signal shows the transmission was right (OK). The output signal of the AND circuit 150 commands the reading of the succeeding characters through line 162, and the transmitting of characters through OR circuit 155 and a flip-flop (FFO)156 and line 163.

When the mode switching operation is commanded, the flip-flop (FF1)157 turns ON and AND circuit 151 provides an output signal to a flip-flop (FF2)158 turning ON said flip-flop 158 at step 5. The flip-flop (FF2)158 provides a signal through line 164 commanding the transmission of signal $\alpha$ in FIG. 4. The signal $\alpha$ is actually transmitted during next step 1. When the station receives a signal CS3 during the time said flip-flop (FF2)158 is ON, a flip-flop (FF3)165 is turned ON, and a signal commanding transmission of signal $\beta$ in FIG. 4 is provided through line 165. Further, on receiving the signal CS1 during the time the flip-flop (FF3)159 is ON, AND circuit 153 provides an output signal, which triggers the switching of a flip-flop (FF4)160 and switches the operational mode from mode 1 to mode 2 or vice versa by providing signals MODE 1 on line 167 or MODE 2 on line 166. The signals MODE 1 and MODE 2 are supplied to many locations of the ARQ equipment, such as AND circuits 50 and 51, AND circuits 82 and 83 in FIG. 6, and AND circuits 104 and 105 and AND circuits 120 and 121 in FIG. 9, defining the operational mode. After the completion of the mode switching operation, the flip-flop (FFO)156 turns ON and the normal operation in a new mode is preformed.

If a switch (S) in FIG. 11 is closed, the mode switching operation is automatically performed according to the quality of the transmission circuit. In FIG. 11, a counter (COU)161 counts an output signal of AND circuit 150. The counter 161 is reset to zero by the signal in step 6. Therefore the content of the counter 161 indicates the number of characters received correctly without a break. When the content of the counter 161 reaches a predetermined value, a signal is applied to the flip-flop (FFO)157 from the counter 161 through the switch (S) and OR circuit 154, and the mode is changed from mode 2 (15 characters) to mode 1 (three characters).

It should be understood that many modifications of FIG. 11 may be possible to those skilled in the art. For instance, full automatic switching including the switching from mode 1 to mode 2 and mode 2 to mode 1 in both master and slave stations according to the quality of the transmission circuit is possible. Further, if the ratio of characters in a block of mode 1 to that of mode 2 is an odd integer, the ARQ equipment can be simple in design.

According to the present invention, the transmission efficiency is, for instance, increased 67 percent assuming that the characters in a block are three characters in mode 1 and fifteen characters in mode 2, from FIG. 2.

As is apparent from the above explanation, the ARQ system with variable length blocks used in a short wave circuit provides effective use of the frequency band and transmission time. Since the short wave band is recently very crowded, the effect of the present invention is extremely beneficial.

What is claimed is:

1. A method for transmitting digital data in a simplex ARQ communication system consisting of a master and a slave station comprising the steps of transmitting a block of characters from the master station to the slave station, transmitting a control signal from the slave station to the master station indicating if said block of characters has been transmitted correctly, retransmitting said block of characters in the case where said control signal indicates the preceding block of characters was transmitted incorrectly, characterized in that the number of characters in said block is variable in direct correspondence with instantaneous transmission quality.

2. A method according to claim 1, wherein said number of characters in a block is an integer multiple as large as a predetermined integer.

3. A method according to claim 1, wherein said number of characters in a block is an odd multiple of a basic length.

4. A method according to claim 1, wherein said number of characters in a block is changed according to the quality of the transmission circuit.

5. A simplex ARQ system comprising at least a transmission memory (T MEM) having two series of memories for temporarily storing a block of characters to be transmitted, a receiving memory (R MEM) having two series of memories for temporarily storing a block of received characters, a transmission control (T CONT) for controlling the operation of said transmission memory (T MEM), a receiving control (R CONT) for controlling the operation of said receiving memory (R MEM), and a mode switching circuit (MODE) for at least switching said series of memories in the transmission memory (T MEM) and the receiving memory (R MEM).

* * * * *